Nov. 5, 1968  K. A. BOYD  3,408,948

POSITIONING OF CONTROL RING

Filed Dec. 12, 1966  6 Sheets-Sheet 1

INVENTOR.
KEITH A. BOYD
BY
Woodhams, Blanchard and Flynn
ATTORNEYS

Nov. 5, 1968   K. A. BOYD   3,408,948
POSITIONING OF CONTROL RING
Filed Dec. 12, 1966   6 Sheets-Sheet 4

INVENTOR.
KEITH A. BOYD
BY
Woodhams, Blanchard & Flynn
ATTORNEYS

United States Patent Office

3,408,948
Patented Nov. 5, 1968

3,408,948
POSITIONING OF CONTROL RING
Keith A. Boyd, Mount Clemens, Mich., assignor to Eaton
Yale & Towne Inc., Cleveland, Ohio, a corporation of
Ohio
Filed Dec. 12, 1966, Ser. No. 600,951
11 Claims. (Cl. 103—161)

ABSTRACT OF THE DISCLOSURE

A fluid displacement device having a plurality of cylinders and pistons in a rotatable cylinder block, said cylinder block having fluid inlet and outlet ports and a seal area therebetween. Control means are arranged around the cylinder block for controlling reciprocation of said pistons within said cylinders, said control means being movable from a zero-displacement position in which said pistons are stationary to a driving position causing fluid flow. Restoring means are provided which generates a restoring moment, which is independent of the internal pump pressure and which urges the control means toward its zero-displacement position. Means are also provided for rendering the control means freely movable radially in any direction with respect to the center around which the cylinders rotate, the magnitude of said movement being sufficient to change the reaction against said control means by said pistons as they cross said seal areas to cause same to move toward the zero-displacement position from at least the positions of maximum displacement in either direction of said control means.

---

This invention relates to the control of a radial piston pump, and, more particularly, to a means for creating, independent of the load on the pump, a restoring moment about the pivot axis of the cam ring when the ring is in an eccentric position with respect to the cylinder block thereby to cause the cam ring to positively seek a neutral position.

Persons familiar with radial piston pumps are familiar with the various types of devices used in their control. Some devices utilize a worm gear connected to the free side of the pivotally mounted cam ring to move said ring about its pivot point while other devices utilize a reciprocating piston similarly connected to the cam ring and operable for the same purpose.

Generally, the control of radial piston pumps involves means which engage the free side of the cam ring and utilize an externally controlled force to move the cam ring in an eccentric direction with respect to the pump rotor and thereby into a flow creating condition. The return of the cam ring to a zero-displacement condition may be carried out by a reversal of such force but for reasons of safety and convenience, it is preferable that such condition occur automatically when said force, as in manual or pedal control of a vehicle, has merely been removed from the free side of the cam ring.

To this end, some known radial piston pumps utilize the reaction force of the cylinders to develop a restoring moment in the pump to return the pump to the zero-displacement position. However, such restoring force is pressure and eccentricity dependent and hence the magnitude of the moment is dependent upon the displacement of the cam ring eccentrically of the cylinder block. Thus, when the cam ring is only slightly displaced, the magnitude of the restoring moment is very small, so small in fact, that the cam ring might not be restored fully to the zero-displacement position. In such case, the pump will continue to produce a small output flow and a vehicle in which the pump is utilized as a driving means would continue to move.

Another disadvantage of known radial piston pump controls is that due to the interaction of many internal and uncontrollable forces, the cam ring will seek a position where all of these forces are nulled out. Sometimes such position of the cam ring is not its neutral position and an unwanted pump output is still provided. Again, if said pump is utilized as a driving means for a vehicle, the vehicle will continue to move unless held otherwise by the braking system.

Therefore, it is an object of this invention to provide a radial piston pump having a cam ring which has the capability of returning to the zero-displacement position from either eccentrically displaced position without the aid of any external force and further, which will do so from a position of low eccentricity.

It is a further object of this invention to provide a radial piston pump as aforesaid having a positive restoring moment applied to its cam ring when said pump is energized, wherein said restoring moment can be controlled at a selected value and a value which is dependent or independent as desired of the pressure being developed at a given moment by said pump.

It is a further object of this invention to provide a means such that when the cam ring is restored to the zero displacement position it will stay in that position and not move in response to internal pump pressures to a displaced position and thereby cause an unwanted pump output.

It is a further object of this invention to provide moments of such magnitude and sense about the pivot pin when the cam ring is swung to an eccentrically displaced position, that said moments will return the cam ring to the zero output, or no-load position, quickly from such eccentrically displaced position.

A further object of the invention is to provide a pump and pump control means as aforesaid in which said restoring moment may by suitable adjustment be diminished to a selected value such that only a light displacing force need be externally applied to the cam ring for effecting displacement of same while still maintaining a positive force urging return of the cam ring to zero-output position, whereby when said pump is installed into a vehicle, a direct linkage may be used between manually, or pedally, actuated means and said cam ring for controlling the position thereof without imposing an excessive burden on the operator of such vehicle.

Other objects and purposes of the invention will be apparent to persons acquainted with apparatus of this general type upon reading the following disclosure and inspection of the accompanying drawings.

General description

The objects and purposes above discussed have been met by providing a radial piston pump having a seal pressure pulse acting on the cam ring and a clearance slightly greater than normal operating clearance between the pivot pin and the wall of the bore in the cam ring into which said pivot pin is received.

Detailed description

In the following description certain terminology will be utilized for the purpose of convenience in reference, but will be understood to be for convenience only and to have no limiting significance. For example, the terms "inward" and "outward" will be taken to refer to directions toward and away from the geometric center of a pump embodying the invention. The terms "clockwise" and "counterclockwise," "right" and "left," and "downward" will all refer to directions with respect to the accompanying drawings. The term "pumping" will be applied to the apparatus of the invention when power is being supplied to the rotor thereof for expelling fluid therefrom under pressure. The term "motoring" will be utilized herein with respect to the same mechanism when the supplying of fluid to said mechanism under pressure results in a rotation of the rotor. As is recognized in connection with devices of this general type, these two terms represent merely two conditions of operation of the same mechanism, depending upon the direction of flow of power therethrough. Said reference terminology will also include words which are derivatives of those specifically mentioned preceding as well as words of similar import.

Figure 1:
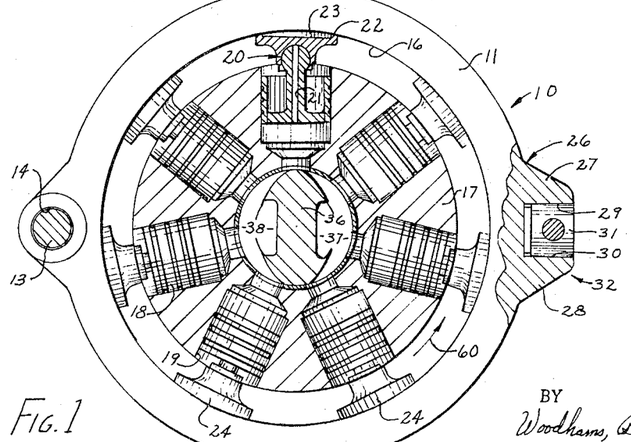
FIGURE 1 is a vertical sectional view through a pump of the type to which the invention is applicable.
Figure 2:
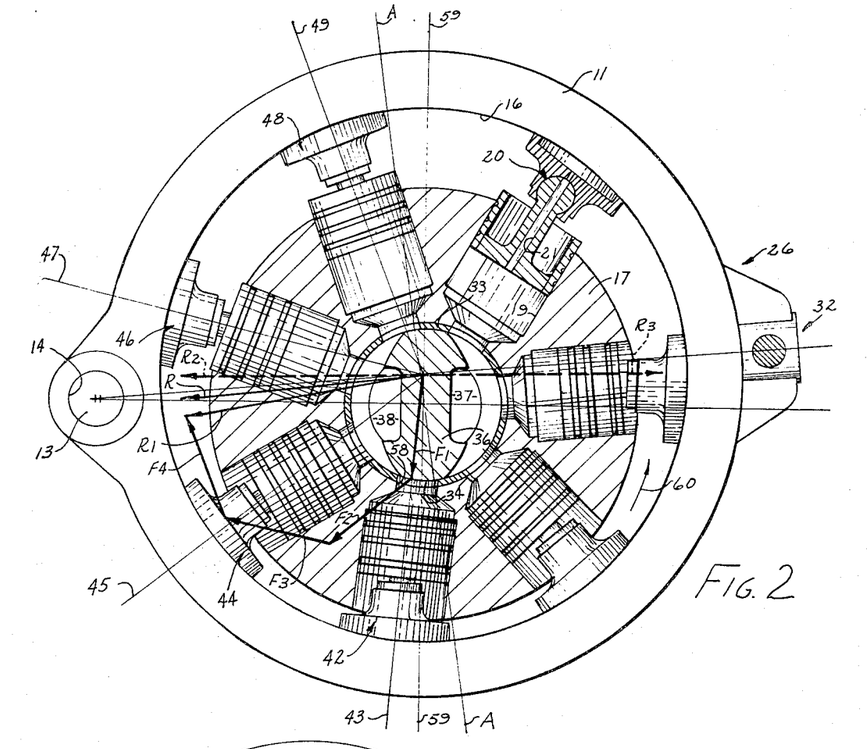
FIGURE 2 is a view showing the mean resultant vector of the piston forces on the cam ring when same is in a first driving position hereinafter referred to as a forward driving position.

The invention is best understood by considering first the construction of a conventional radial piston pump and then considering the modification thereof provided by the present invention. The pump will be described for the cam ring positioned as shown in FIGURES 1 and 2. It will be understood, however, that the cam ring can be displaced downwardly so that the discharge and intake ports hereinafter defined will be reversed.

A radial piston pump 10 of conventional design is illustrated in FIGURE 1 and comprises a cylindrical cam ring 11 having a bore 14 through the left end (FIGURE 1) of the cam ring which bore pivotally encircles stationary pivot pin 13.

The cylindrical cam ring 11 has a cam surface 16 which in this embodiment is concentric with the cylindrical body of the cam ring. A cylinder block 17 is positioned (concentrically in the FIGURE 1 position) within the cam ring 11 and is rotatable with respect thereto. That is, the axis of the cylinder block in the position as shown in FIGURE 1 is coincident with the axis of the cam ring and the cylinder block rotates on its said axis. The cylinder block 17 carries a plurality of pistons 18 mounted for reciprocation in radial cylinders 19 in the cylinder block 17.

The radially outer ends of the pistons 18 are connected to shoes 19 by a ball-and-socket joint 20 thus enabling the shoes 24 to swivel in any direction with respect to the centerline of the piston. Openings 21 are placed in a known manner axially through the pistons 18, the ball-and-socket joint 20 and the shoes 19 to introduce oil between the shoe bearing surface 22 and the cam surface 16 and into the depression 23 in the bearing surface 22 of the shoe 19 for lubrication purposes.

The free end 26 of the cam ring 11 is provided with a pair of oppositely disposed bosses 27 and 28 extending outwardly therefrom. The inner facing surfaces 29 and 30 of said bosses are arcuately shaped to conform to the diameter of the cylinder 31 of the cylinder-and-socket connection 32, the same being provided as set forth in my copending application Ser. No. 536,009 to control the position of said cam ring 11.

A pintle 36 is positioned axially through the cylinder block 17 to direct the oil within the pump in the usual manner. Particularly, in the forward driving (FIGURE 2) position oil comes from the intake port into chamber 37 of the pintle and thence into those of cylinders 19 which are in communication therewith and oil flows from those of cylinders 19 which are exerting pressure into the discharge chamber 38 of the pintle and is conducted thence to the output port of the pump. With the cam ring in a lowered position, namely, the reverse drive position, the chamber 38 becomes the suction side of the pump and the chamber 37 becomes the pressure side and the direction of oil flow therethrough is reversed. The pintle is rotatively adjustable to a limited extent in any conventional manner but is stationary in any given adjusted position.

The pintle 36, in this embodiment, is constructed so that there exists a pair of lands 33 and 34 dividing the chambers 37 and 38 from each other. The lands between the respective chambers 37 and 38 form a pair of sealing zones, the purpose of which will be later explained.

In the pump of the invention, the foregoing-described conventional design is modified by providing that the diameter of the bore 14 is greater than the diameter of the pivot pin 13 by an amount slightly greater than the manufacturing tolerance permitted for said pin and bore. For example, in a pump of four inches rotor diameter, 7/16 piston stroke, and a manufacturing tolerance of 0.0005 inch for the diameter of each of said pin and bore, the diameter of the bore 14 is greater than the diameter of the pivot pin 13 in the order of from approximately 0.004 to approximately 0.030 inch. The apparent optimum is at about .010 inch although since ease of control and operational stability is at least partly subjective, this optimum is somewhat a matter of choice and will vary with the wishes of an individual designer.

In more general terms, the magnitude of, and possible variations in, this clearance will vary for reasons which will become more evident as the descriptions proceed and hence further elaboration thereof will be deferred until after the operation of the appaartus has been described.

The specific operation of this construction will later become apparent.

Figure 3:
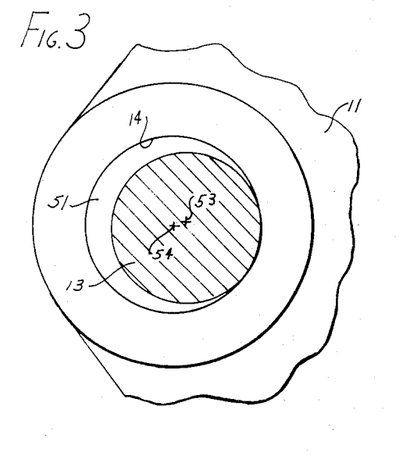
FIGURE 3 is a view showing the displacement of the cam ring pivot point when there is a clearance around the pivot bolt and the cam ring is moved into said first driving position.
Figure 3A:
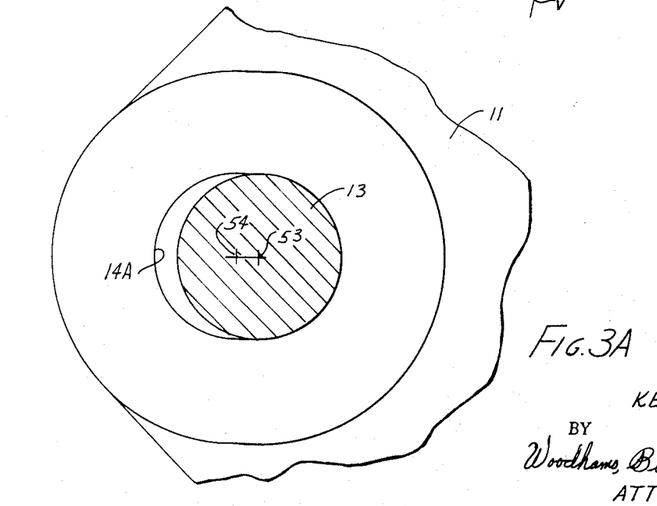
FIGURE 3A shows a modified structure.
Figure 4:
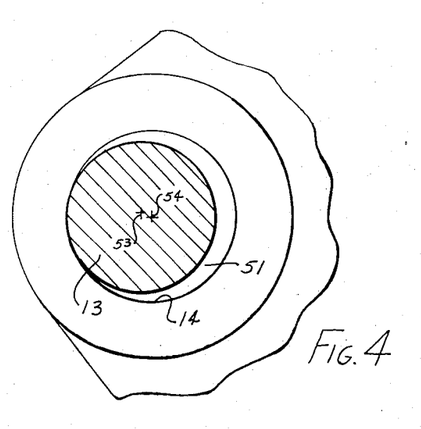
FIGURE 4 is a view similar to FIGURE 3 showing the displacement of the cam ring pivot point when there is a clearance around the pivot bolt and the cam ring is moved into said second driving position.

As shown in FIGURE 3A the oversized circular opening 14 may be replaced by an elongated opening 14A providing the same clearance in a direction from the center of the pin toward the center of the rotor as above described for the excess diameter of the opening 14.

*Operation*

The operation of the pump 10 is basically similar to the operation of other radial piston pumps. That is, radial displacement of the cam ring relative to the cylinder block 17 will cause the pistons 18 to reciprocate within cylinders 19 when the cylinder block is rotating with respect to the ring and thus result in an output of the pump. More particularly, in the forward drive position, as above defined, oil will be pulled into the intake port 37 and into those of cylinders 19 when the pistons are centrifugally thrown outwardly. When the pistons are pushed inwardly, the oil collected within the cylinders 19 will be expelled appropriately into the discharge port 38.

The same basic operation occurs in the pump 10 embodying the invention. The unique characteristic provided by making the bore 14 oversize as above mentioned will now be examined.

A vector diagram is illustrated in FIGURE 2. The vectors F1, F2, F3 and F4 represent the normal force on the cam ring surface 16 of the piston and shoe assemblies under pressure in the position shown. The direction of the resultant vector obtained by the vector addition of vectors F1 to F4 is represented by $R_1$. More particularly, F1 represents the normal force on the cam surface 16 by the piston and shoe assembly 42. F2 represents the normal force on the cam surface 16 by the piston and shoe assembly 44. F3 and F4, likewise, represent the normal force on the cam surface 16 by the piston and shoe assemblies 46 and 48, respectively. Vectors F1, F2, F3 and F4 are parallel to lines 43, 45, 47 and 49, respectively, said lines representing the direction of the normal force on the cam ring of the respective piston and shoe assemblies.

Recognizing that the actual resultant vector varies in direction, that is, oscillates, as the cylinder block rotates within the cam ring, the vector R is drawn as a mean resultant vector to represent the mean direction of the actual resultant vectors. As shown in FIGURE 2, the resultant vector does not pass through the centerpoint of the pivot pin 13. Thus, a restoring moment is created thereby. However, this moment, while useful, is effective only at very large eccentricities, since the magnitude of the moment is a function of the magnitude and direction of R and is therefore itself pressure and eccentricity dependent. At low eccentricities of the cam ring it is of little consequence and hence incapable of effecting the desired restoration entirely to a zero displacement position. In carrying out the invention, a means was devised to create a restoring moment which is not pressure dependent. This was accomplished by utilizing a "seal pressure pulse" which is created by the piston and cylinder port passing from the discharge port to the intake port over a seal zone or area on the pintle.

Figure 5:
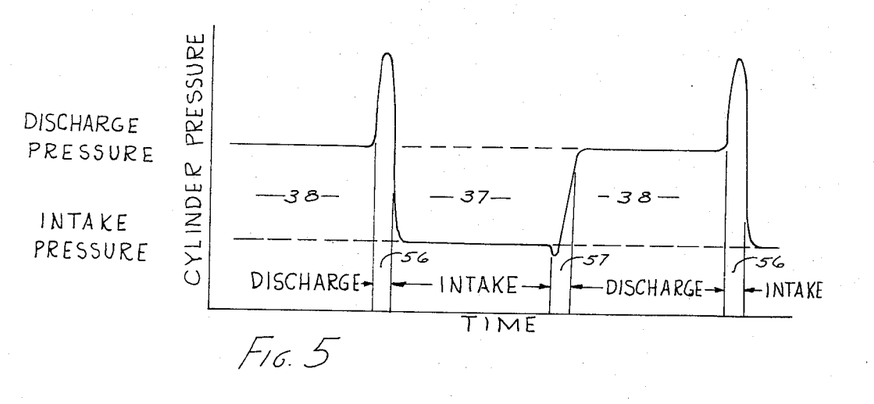
FIGURE 5 is a cylinder pressure versus time graph depicting the variations in cylinder pressure during the transition from the discharge port to intake port and vice versa.

Referring to FIGURE 2, the seal pulse is developed as a piston and cylinder pass from the discharge port 38 to the intake port 37. The cylinder 19 becomes essentially sealed by the bottom sealing land 34 on the pintle 36 and, with the cam ring displaced into its forward drive position, the piston is still being pushed inwardly by the cam ring and the cylinder chamber is still being reduced. As a result, a pressure is built up within the cylinder momentarily until the cylinder chamber becomes connected to the intake port, at which time the cylinder pressure is reduced to the intake pressure. Therefore, the fluid pressure within the cylinder increases rapidly, but only momentarily, thereby creating a short but substantial pulse tending to restore the cam ring to its neutral position. However, as cylinder 19, crosses the upper sealing land 33, the piston is still moving outwardly and hence no pulse, is created here. This is illustrated graphically in FIGURE 5, as successive piston and cylinder assemblies pass over the sealing lands between the discharge port and the intake port. Thus, the net force acting on the cam ring, due to the increased cylinder pressure in the area of the sealing land 34 is exerted downwardly or in a direction opposite to the manually applied force on the control means 32 holding the cam ring in the raised position. Thus, when the force on the control means is released, the cam ring will automatically return to the zero-displacement position due to the urging of the seal pulse.

Figure 2A:
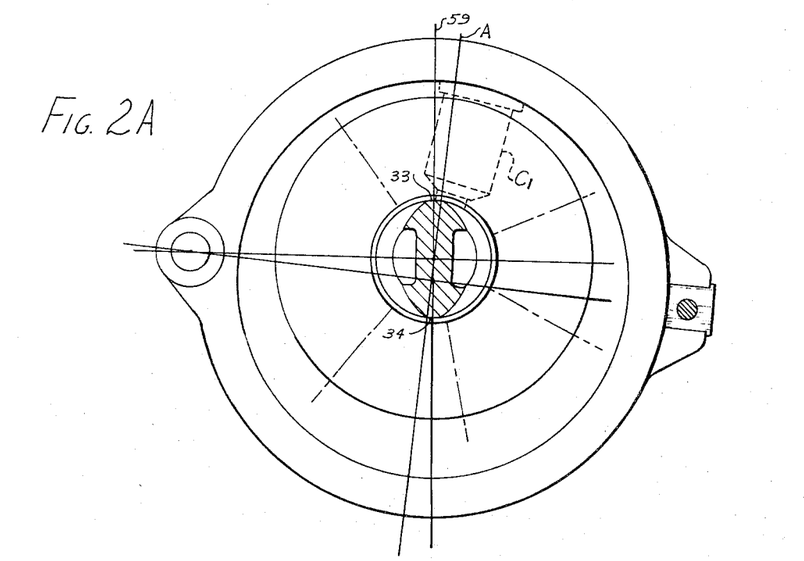
FIGURE 2A is a somewhat schematic view generally similar to FIGURE 2 but showing the cam ring in a second driving position hereinafter referred to as a reverse driving position.
Figure 2B:
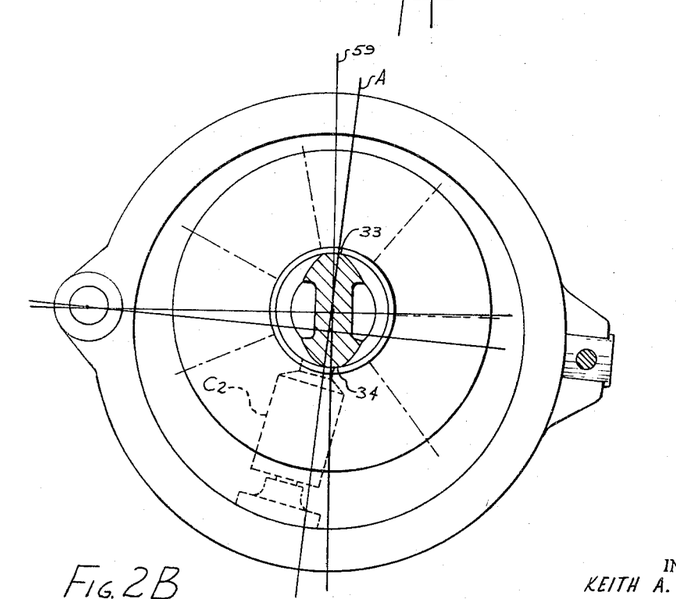
FIGURE 2B is similar to FIGURE 2A but showing the rotor in a different position.

In the reverse drive position, however, with a conventional pump a different condition occurs. Here, with reference being made now to FIGURE 2A wherein the line A indicates the points of transition between the compression and suction zones of the pump, the cylinder C1 schematically indicated therein has passed the compression zone and is starting into the suction zone before it comes sufficiently onto the upper seal area 33 to develop a seal area pulse as above described. However, a cylinder in the position of C2 (FIGURE 2B) is starting to compress as it enters the area of the seal area 34. Therefore, in a reverse drive position, particularly in the extreme eccentric position shown in FIGURE 2B the effect of the seal pulse is to drive the cam ring still further into an eccentric direction. Therefore, in a conventional pump if the seal areas 33 and 34 are made of sufficient width to develop a seal pulse of any consequence, it will act in a restoring direction in what is here termed the forward drive direction but will act in an eccentrically urging direction in what is here termed the reverse drive direction. Therefore, such force is useless to obtain the restoring moments desired for the purpose above set forth and will need, at least in said reverse direction, to be minimized as much as possible.

Figure 6:
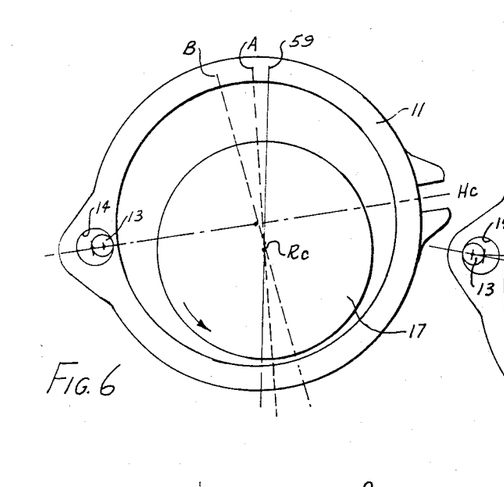
FIGURE 6 is a schematic representation of a radial piston pump of the invention showing the position of the critical areas when the cam ring is displaced into the forward driving position.
Figure 7:
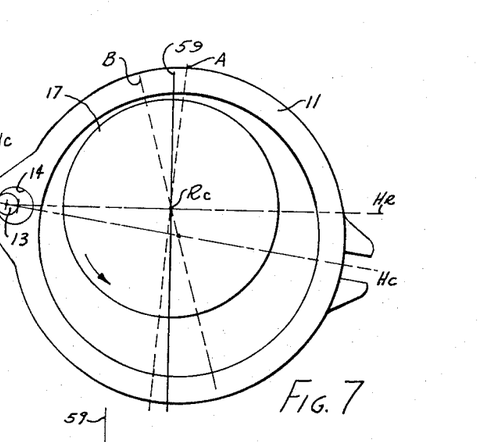
FIGURE 7 is a schematic representation of a radial piston pump of the invention showing the position of the critical areas when the cam ring is displaced into the reverse driving position.

However, with the clearance above described between the pivot opening 14 of the cam ring and the pivot pin 13, this situation is corrected. Referring to FIGURE 6, where the line A represents the point of transition between the compression and suction sides of the pump in the forward driving direction without cam pin clearance, line B represents the point of transition with cam pin clearance, and the line 59 represents the centerline of the seal areas 33 and 34, the cam ring is shifted slightly to the left with respect to the rotor by reason of the pressure being developed between said rotor and the left side of said cam ring. In this situation the seal pulse is still developed on the lower side of the cam ring because the pistons are still being compressed as they pass the line 59. No disturbing force is developed on the upper side of the cam ring because said pistons are still under suction as they pass the line 59, i.e., the center of the upper seal area 33. Therefore, cam pin clearance increases the neutral seeking tendency in the forward driving direction. However, in the reverse driving direction, as illustrated in FIGURE 7, the cam ring has now shifted slightly to the right with respect to the rotor due to the pressure being developed between said rotor and the right hand side of the cam ring. This in effect rotates the line A somewhat counterclockwise. In other words, the point of transition from the compression zone at the right of the rotor to a suction zone at the left of the rotor is moved from line A to line B indicated in FIGURE 7. Under these circumstances, a piston passing the line 59, that is passing the center of the seal area 33, is still being compressed so as to exert a seal pulse urging the cam ring back toward neutral position. In this situation, a cylinder passing below the seal area 34 is still expanding in volume and hence will not exert a seal pulse force on the cam ring.

Therefore, it is apparent that by providing the clearance above mentioned around the pivot pin 13, the restoring tendency obtained by the seal pulse in the forward drive position (FIGURE 6) is increased and the restoring tendency obtained by the seal pulse in the reverse drive (FIGURE 7) position is obtained. Thus, the cam ring is provided with a restoring pulse urging it toward its neutral position regardless of whether it is in forward or reverse drive position and regardless of the amount of eccentricity of the cam ring at any given time.

The clearance 51 around the pivot pin 13 also permits a less restricted positioning of the pintle ports 37 and 38. That is, the pintle can be shifted (rotated) with respect to the cylinder block over a greater range without affecting the stability of the pump.

In practice, it is sometimes advantageous to rotate the pintle in such a manner as to make the resultant force R unstable, i.e., tend to increase eccentricity and therefore rely solely on the seal pulse force for stability. An example of such an application is disclosed in my copending application Ser. No. 527,375, describing a hydrostatic transmission system which may be used to drive a vehicle. In such a case an important safety feature is found in that a reversal of forces on such vehicle, such as when same is going downhill, tends to bring the vehicle to a stop rather than tending to cause it to run away.

Figure 8:
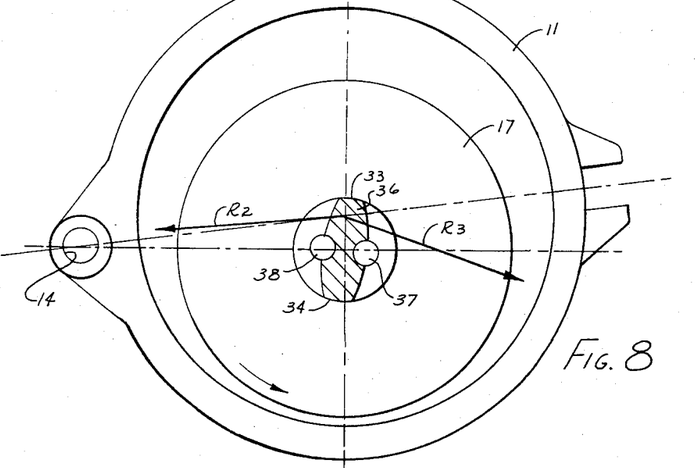
FIGURE 8 is a schematic illustration of the reaction forces applied by the piston and cylinder groups in a selected position of the suction and pressure ports against the cam ring under both pumping and motoring conditions when said cam ring is displaced in the direction of FIGURE 6.
Figure 9:
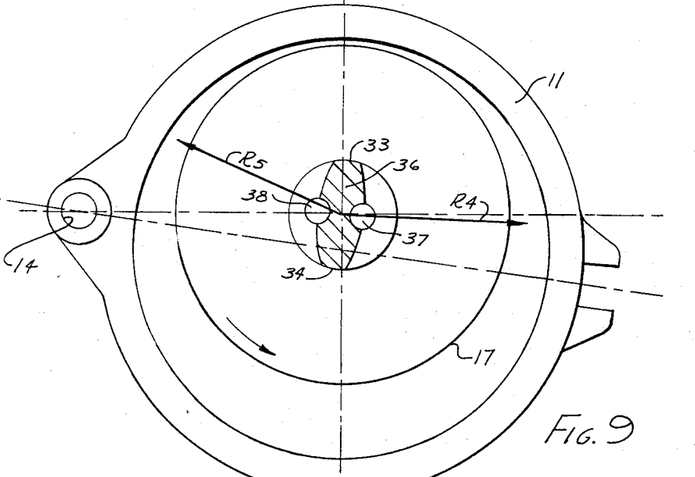
FIGURE 9 is a schematic illustration of said resultant reaction forces applied to said cam ring in a selected position of the suction and pressure ports when same is in the displacement direction of FIGURE 7.

This can be accomplished in the arrangement according to the invention by recognizing that the resultant R is developed by forces created by the pistons communicating with the pressure side of the pintle and that the direction of said resultant R is controlled by the angular location of pintle ports 37 and 38 relative to the pivot pin. For any given eccentricity of the cam ring, said resultant R will rotate clockwise with clockwise rotation of the pintle and will rotate counterclockwise with counterclockwise rotation of the pintle. Thus, by rotating the pintle slightly clockwise, the resultant R may be caused to assume a position $R_2$ as indicated in FIGURE 2. This passes on the upper side of the center of pivot 13 and tends to provide a counterclockwise rotation of the cam ring about the pivot 13 which intends to increase eccentricity thereof. Now, when there is an overdriving tractive effort, as encountered on a hill, the pump 10 becomes a motor and is capable of absorbing power and thereby reducing vehicle ground speed. For the case of vehicle moving forward down a hill with the cam ring in the forward drive position, the cam ring is shifted upward as shown in FIGURE 2 and pintle port 37 is under pressure causing a resultant force against the cam ring to the right as depicted by $R_3$ in FIGURE 8. Since the resultant passed above the pivot point, a clockwise moment is exerted on the cam ring tending to move it to its neutral position. Therefore, if external control effort by the operator is removed, the vehicle will slow down. The same characteristic also occurs in reverse, i.e., cam ring in the reverse drive position with a vehicle backing down a hill. In this case the overdriving tractive effort changes the identity of the intake and pressure ports thus creating a resultant force $R_5$ as shown in FIGURE 9 to the left of the cam ring exerting a counterclockwise moment on the cam ring tending to return it to neutral.

Arrow $R_4$ indicates the resultant of the reaction forces on the cam ring in a reverse driving setting thereof during pumping conditions and shows that same goes very close to the pivot pin 13. Thus, it will provide a moment urging the cam ring either toward or away from the zero-displacement position depending upon the precise amount of rotation of the pintle. In either case, however, the moment will be small since the resultant $R_4$ passes very close to the pivot pin 13.

Figure 10:
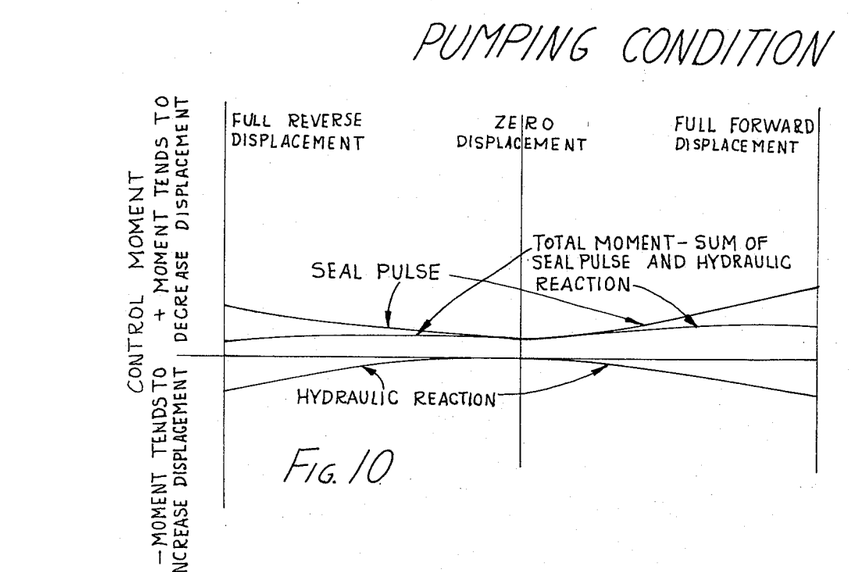
FIGURE 10 is a graph showing the variations in resultant forces on the cam ring under various displacements thereof during pumping conditions.
Figure 11:
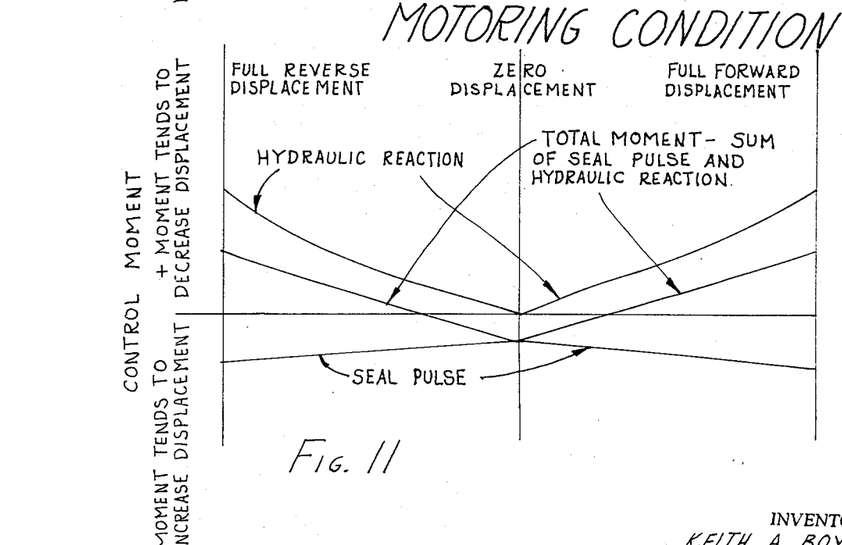
FIGURE 11 is a graph showing the resultant forces applied to the cam ring during various positions of displacement thereof under motoring conditions.

FIGURES 10 and 11 represent the relationship of the seal pulse and hydraulic reaction moment action on the cam ring for typical values of system pressure, engine r.p.m. and the clearance between the pivot pin 13 and the opening 14. Specifically, FIGURE 10 shows the relationships under pumping conditions and FIGURE 11 shows the relationships under overdriving (motoring) conditions. It will be noted that, under pumping conditions, a slight clockwise rotation of the pintle combined with adequate clearance at the pivot pin 13 results in a positive restoring moment on the cam ring tending to return it to its zero-displacement position over the full range of displacement setting. Under motoring conditions, the seal pulse is negative as shown in FIGURE 11. Combining the seal pulse with the hydraulic reaction moment results in a null position at about one-fourth of the maximum-displacement setting as shown in FIGURE 11. For a typical vehicle with a top speed of 8 m.p.h., the seal pulse and hydraulic reaction moments will cause the pump to resist overdriving tractive efforts under motoring conditions and limit the maximum ground speed without external control effort to approximately 2 m.p.h.

Therefore, it is possible to combine allowance between bore 14 and cam pin 13 with a slight clockwise rotation of pintle ports 37 and 38 to obtain a neutral seeking control under pumping conditions and also obtain resistance to overdrive loads that will limit the maximum ground speed without external control effort to some small percentage of the maximum ground speed. Various combinations of cam pivot pin allowance and pintle angular positions can be used to obtain overdriving speed limits of from .1 to .5 of the maximum speed. We have found that speed limits greater than .5 of the maximum speed are of little value on small vehicles from a safety standpoint and that speed limits less than .1 of the maximum are impractical to obtain due to manufacturing tolerances.

The clearance 51 around the pivot pin 13 also is used to prevent the cam ring which may be slightly off-center due to manufacturing tolerances from moving under internal pump forces to a displaced position thus resulting in an unwanted pump output which might otherwise occur even when the cam ring is supposed to be at its neutral position. By purposefully introducing a substantially large clearance around the pivot pin, the cam ring is permitted to shift due to such clearance to seek a neutral position resulting in zero pump output and thus eliminating the problem of the cam ring seeking a neutral position other than the zero-displacement position.

The magnitude of the seal pulse is controlled by the length of the sealing land. That is, and referring to FIGURE 2, the sealing lands 33 and 34 in this embodiment are each of circumferential length a little more than the diameter of the opening 58 connecting the cylinder 19 to the respective ports in the pintle 36. The greater the circumferential length of the sealing land becomes, the greater the seal pulse and in turn the greater the force urging the cam ring toward the zero-displacement position.

However, if desired, the lands 33 and 34 may be of a circumferential length slightly less than the diameter of openings 58 inasmuch as the restriction of said openings 58 by the lands 33 and 34, even though they are not entirely closed, will still develop a useful pulse.

Although the clearance around the pin 13 has been indicated above for a given size of pump, a more general explanation of such clearance, and the various factors which control same, may now be made.

Figure 7A:
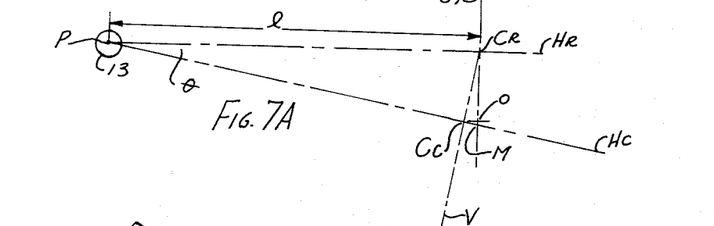
FIGURE 7A is a diagram based on FIGURE 7 and illustrating some of the geometry of the device.

(a) As a starting point, it has been discovered that such clearance (excepting as modified by the factors discussed below) should be at least an amount equal to the distance the cam ring center $C_c$ (FIGURE 7A) backs away from the line 59 (vertical line through the centers of the seal faces 33 and 34 in the neutral position thereof, said line is also a line perpendicular to the line $H_R$ extending through the centers of the pin 13 and the rotor 17) when said cam ring is moved out of its zero-displacement position. This may be expressed as a distance $h$ in excess of the tolerance permitted in the distance between the center of the pin 13 and the center of the cam ring 11. This is also the distance $C_cO$ which for all practical purposes is equal to the distance $C_cM$ (M being the intersection of line 59 with line $H_c$ through the centers of the pin 13 and the cam ring 11). The quantity $l$ is the distance from the center of the pin 13 to the center of the rotor.

Thus:

$$h = C_cO \cong C_cM$$
$$C_cM = PM - PC_c$$
$$PM = l \sec \theta$$
$$\therefore h \cong l \sec \theta - l$$
$$h \cong l(\sec \theta - 1)$$

This value is that required for complete stability derived from this source alone and for example, in a pump wherein $l$ equals 3.125 inches, and E (at maximum eccentricity) equals 0.218 inch, $h$ equals, or is greater than, 0.0077 inch.

(b) However, since the restoring moment derived from the resultant R, as above described, is still effective, particularly at the larger eccentricities, it is not necessary to provide for complete stabilizing on the basis of this clearance alone. Thus, as a practical matter it will usually be sufficient if the clearance around the pin 13 is as low as 0.002 on each side (0.004 diametric clearance) in excess of the tolerances permitted for said pin in a given construction in order to make sure that regardless of such tolerances the cam ring will actually shift with respect to the center of the rotor in the manner above described. Thus, in a pump having a tolerance of plus or minus 0.003 inch on the location of the cam center relative to the rotor center, there would be required a clearance provided on each side of pin 13 as described herein of at least .005 in order to make sure that under any conditions of offsetting due to tolerances, the relative movement of the cam ring and the rotor as above described can still take place. It will be recognized, of course, that excessive clearances around the pin 13 would create both an operating and wear problem for the pump so that it is desirable to hold such clearance to the minimum consistent with obtaining the restoring forces desired.

The embodiments of the invention in which an exclusive property or privilege is claimed are defined as follows:

1. In a fluid displacement, rotary, pressure creating device having a plurality of cylinders and pistons in a rotatable cylinder block, the combination comprising:
    fluid inlet and outlet ports and a seal area therebetween;
    control means arranged around said cylinder block for controlling reciprocation of said pistons within said cylinders, said control means being movable from a zero-displacement position in which the pistons are stationary to a driving position causing fluid flow;
    restoring means effective as said cylinders pass over said seal area in said driving position to generate a restoring moment, which is independent of internal pump pressure, urging said control means toward its zero-displacement position and means rendering said control means freely translatable radially in any direction with respect to the center around which said cylinders rotate;
    whereby said control means can freely move radially in any direction with respect to the center of said cylinder block, the magnitude of said movement being an amount sufficient to change the reaction thereagainst by said pistons as they cross said seal area to cause said control means to move toward a zero-displacement position from at least the positions of maximum displacement in either direction of said control maens.

2. In a fluid displacement device defined in claim 1 wherein said control means comprises a cam ring pivotable about a pivot pin through a bore therein and said restoring means comprise means translating the center of said cam ring radially with respect to the rotative center of said cylinder block.

3. In a fluid displacement device defined in claim 1 wherein said control means comprise a cam ring having a bore therein about which said cam ring pivots to effect said reciprocation, a pivot pin extending through said bore and being radially immovable with respect to the center about which said cylinder block rotates and said restoring means comprise means wherein said cam ring is radially translatable with respect to said pivot pin.

4. The device defined in claim 2 wherein said cam ring and the housing of said pump are pivotally related by pin and bore means and wherein said restoring means comprises the constructing of said bore sufficiently larger than the diameter of said pin to permit a relative motion between said cam ring and said housing, whereby said cam ring can move translatably with respect to the axis of said cylinder block.

5. The device defined in claim 4 wherein the magnitude of difference between the diameter of said bore and said diameter of said pin is in excess of the manufacturing tolerance provided therefor.

6. The device defined in claim 4 wherein the magnitude of difference between the diameter of said bore and said diameter of said pin is in excess of the manufacturing tolerance provided therefor by an amount equal to from about .004 inch to about .030 inch.

7. The device defined in claim 4 wherein the fluid inlet and fluid outlet ports are rotatably positionable with respect to said cam ring, whereby to modify the magnitude of the reaction forces of said cylinders and pistons thereagainst and to cause same to selectively supplement or oppose said restoring moment.

8. The device defined in claim 4 wherein said fluid inlet and fluid outlet ports are positioned to cause said reaction forces when said cam ring is eccentrically displaced in one direction to urge said cam ring toward its zero-displacement position when under pumping conditions and away from its zero-displacement position when under motoring conditions and when said cam is in its opposite eccentric position said reaction forces will under motoring conditions tend to urge said cam ring toward a zero-displacement position and under pumping conditions tend to urge said cam ring away from a zero-displacement position.

9. The device defined in claim 2 wherein the reaction forces developed by said piston and cylinders against said cam ring are so combined with said restoring moment in magnitude and direction that under pumping conditions there will be in substantially all positions of the cam ring at least a low net force applied to the cam ring urging same toward the zero-displacement position.

10. The device defined in claim 2 wherein the reaction forces developed by said piston and cylinders against said cam ring under motoring conditions there will at least in the positions of higher cam ring displacement be applied thereto a substantial net force urging said cam ring toward zero-displacement position.

11. In a fluid displacement, rotary, pressure creating, device having a plurality of cylinders and pistons in a rotatable cylinder block, the combination comprising:
    frame means;
    fluid inlet and outlet ports and a seal area therebetween;
    control means comprising a cam ring having a bore therein pivotally embracing a pivot pin fixed to said frame means for controlling reciprocation of said pistons within said cylinders, said control means being movable from a zero-displacement position in which the pistons are stationary to a driving position causing fluid flow;
    restoring means comprising the constructing of said bore sufficiently larger than the diameter of said pin to permit a relative motion between said cam ring and said frame means, whereby said cam ring can move translatably with respect to the axis of said cylinder block, same being effective as said cylinders pass over said seal area to generate a restoring moment independent of internal pump pressure, the magnitude of difference between the diameter of said bore and the diameter of said pin being in excess of the manufacturing tolerance provided therefor by an amount sufficient to permit such shifting of the cam ring as to change the reaction thereagainst by the pistons as they cross said seal areas to cause same to move free of any mechanical urgance toward a zero-displacement position from at least the positions of maximum displacement in either direction of said cam ring.

References Cited

UNITED STATES PATENTS

| | | | |
|---|---|---|---|
| 2,673,526 | 3/1954 | Horton | 103—161 |
| 2,853,025 | 9/1958 | Van Meter | 103—162 |
| 2,915,985 | 12/1959 | Budzich | 103—162 |
| 3,064,583 | 11/1962 | Burt | 103—161 |
| 3,082,696 | 3/1963 | Henrichsen | 103—161 |

FOREIGN PATENTS

| | | |
|---|---|---|
| 594,852 | 11/1947 | Great Britain. |
| 721,787 | 8/1952 | Great Britain. |

WILLIAM L. FREEH, *Primary Examiner.*